(12) United States Patent
Rotte et al.

(10) Patent No.: US 7,857,231 B2
(45) Date of Patent: Dec. 28, 2010

(54) ROTATABLE DISC AND METHOD FOR ADJUSTING ITS ORIENTATION

(75) Inventors: Jeroen Rotte, Breda (NL); Jerry Roctus, Clinge (NL); Nicolaas Johannes Damstra, Breda (NL); Chris Kuppens, Oosterhout (NL); Peter Vissers, Prinsenbeek (NL)

(73) Assignee: Thomson Licensing, Boulogne-Billancourt (FR)

( * ) Notice: Subject to any disclaimer, the term of this patent is extended or adjusted under 35 U.S.C. 154(b) by 1045 days.

(21) Appl. No.: 11/579,205

(22) PCT Filed: May 4, 2005

(86) PCT No.: PCT/EP2005/052040

§ 371 (c)(1),
(2), (4) Date: Oct. 31, 2006

(87) PCT Pub. No.: WO2005/109858

PCT Pub. Date: Nov. 17, 2005

(65) Prior Publication Data

US 2008/0029589 A1    Feb. 7, 2008

(30) Foreign Application Priority Data

May 7, 2004  (EP) .................................. 04300258

(51) Int. Cl.
*G06K 19/06* (2006.01)
(52) U.S. Cl. ...................................... 235/494; 235/454
(58) Field of Classification Search ................. 235/494, 235/454
See application file for complete search history.

(56) References Cited

U.S. PATENT DOCUMENTS 5,396,063 A * 3/1995 Ito et al. ................. 250/231.18

(Continued)

FOREIGN PATENT DOCUMENTS

EP       0089724       9/1983

(Continued)

OTHER PUBLICATIONS

Patent Abstracts of Japan, vol. 2000, No. 12, Jan. 3, 2001 & JP 2000/266986 (See Ref. AF).

(Continued)

*Primary Examiner*—Ahshik Kim
(74) *Attorney, Agent, or Firm*—Robert D. Shedd; Robert B. Levy; Jorge Tony Villabon

(57) ABSTRACT

A rotatable disc comprises a first zone in which a plurality of features, e.g. optical filters, are located at uniform angles from each other with respect to an axis of rotation of the disc and a second annular zone comprising sets of adjacent marks of a first type and of a second type. Each set may have a same total circumferential length, but the marks of a given type may have at least two different total circumferential lengths within a set of marks, or may be distinguishable by the relative position of marks of the different type to each other. The adjacent marks of the first and the second type may also form a code pattern that can be used for identifying the features. A method for adjusting the rotational orientation of the disc based on detecting the widths of the sectors is described.

20 Claims, 4 Drawing Sheets

U.S. PATENT DOCUMENTS

| | | | |
|---|---|---|---|
| 5,648,869 A | 7/1997 | Ikoh | |
| 6,323,995 B1 | 11/2001 | Takahama et al. | |
| 7,057,162 B2 * | 6/2006 | Rentzsch | 250/231.14 |
| 2004/0061861 A1 | 4/2004 | Rentzsch | |

FOREIGN PATENT DOCUMENTS

| | | |
|---|---|---|
| EP | 1403672 | 3/2004 |
| JP | 63-269139 | 11/1988 |
| JP | 2000/266986 | 9/2000 |

OTHER PUBLICATIONS

Patent Abstracts of Japan, vol. 0130, No. 87, Feb. 28, 1989 & JP 63-269139 (See Ref. AG).

Search Report Dated Jul. 28, 2005.

* cited by examiner

ROTATABLE DISC AND METHOD FOR ADJUSTING ITS ORIENTATION

This application claims the benefit, under 35 U.S.C. §365 of International Application PCT/EP05/052040, filed May 4, 2005, which was published in accordance with PCT Article 21(2) on Nov. 17, 2005 in English and which claims the benefit of European patent application No. 04300258.3, filed May 7, 2004.

FIELD OF THE INVENTION

The present invention relates to a rotatable disc comprising a first annular zone in which a plurality of first features are located and a second annular zone carrying a plurality of distinguishable marks of a first and a second type. The first and the second annular zones are arranged essentially concentric to each other. Such a rotatable disc is useful in many technical devices in which the features of the first annular zone are to be placed alternatively at a given location in order to achieve a technical effect. In the subsequent description, only optical filters shall be considered as examples for said features, but it is obvious to the skilled person that the invention is not restricted thereto.

DESCRIPTION OF THE RELATED ART

JP 63 269 139 A gives an example of a rotatable disc as defined above, in which the features are filters for a television camera. By mounting these filters on a rotatable disc, they can be exchanged quickly by simply rotating the disc. However, care must be taken that the correct one of the various types of filters of the disc is placed in the optical path of the camera, and that the filter is placed exactly, so that the optical path is not partially blocked by the filter mount.

To this effect, the prior art disc has four sectors that are arranged in the second annular zone, each sector corresponding to one filter. A pattern is formed in each of the sectors, which allows identifying the filter, which is currently placed in the optical path. The pattern comprises six fields arranged in an array of two lines at different radii. Each line has three fields, wherein each field is either of a first or of a second type. The central fields of both lines taken together identify a currently active filter, whereas the two adjacent fields in both lines taken together identify the filters on either side of the active filter. These patterns are suitable for identifying a filter, but since it takes at least two fields at different radii of the disc to identify one filter, two sensors are necessary to determine the type of these fields. Moreover, it is not possible to tell from the signals of these two sensors whether they are seeing a central column of the pattern or a lateral one, so that for placing a filter correctly in the optical path, additional means are necessary for detecting the rotational orientation of the disc.

BRIEF SUMMARY OF THE INVENTION

One object of the present invention is to provide a rotatable disc, which allows, by simple means, to identify, which one of various uniformly spaced features of the disc is in an active position, and to determine exactly the orientation of the disc.

Another object is to provide a disc assembly comprising a disc as defined above and means for adjusting its orientation.

A further object of the invention is to provide a video camera in which a disc as defined above is used as a filter disc.

A still further object of the invention is to provide a method for adjusting the orientation of the disc as defined above.

The first object of the invention is achieved by a rotatable disc including a first annular zone, in which a plurality of features is located centred along a first radius. The features are preferably spaced at uniform angles from each other with respect to an axis of rotation of the disc. The disc further includes a second annular zone carrying sets of distinguishable marks of a first and a second type. The marks are arranged in a single line centred along a second radius. Each set of marks preferably has the same total circumferential length. The marks of the first and the second type are arranged within the set of marks such that they form a code that allows for unambiguously identifying the respective set of marks.

The code for identification may include a sequence of first and second marks that can be identified. The code may also include different summed total lengths of all marks of the first and the second type, respectively, in one set of marks, in order to identify the position of the disc. Each set of marks may further include an identification indicating start and end of a set of marks, or, more general, the borders between two neighbouring sets of marks. The identification of a border between two neighbouring sets of marks may be achieved by a predetermined sequence of the first and second marks.

The first and second marks within a set of marks may be arranged symmetrically to the centre of the set of marks, thus allowing for identification during rotating the disc in either direction.

The marks within a set of marks may also be arranged so as to unambiguously identify the centre of the set of marks. The arrangement of marks for this purpose may include a special sequence of marks of the first and second type, preferably a symmetrical one. Detecting the centre of a set of marks can advantageously be used to determine a desired positioning of one of the features that are provided in the first annular zone.

In a preferred embodiment, the sets of marks of a first and a second type are arranged in the second annular zone at uniform angles with regard to each other with respect to an axis of rotation of the disc. Each set of marks of the first and the second type preferably having the same total circumferential length. Within the set of marks, the marks of the first and second type may be equidistantly arranged with regard to each other. The marks of both types may either have equal individual lengths, or may have different lengths.

In one embodiment of the invention, the rotatable disc includes a first zone in which a plurality of features are located at uniform angles from each other with respect to an axis of rotation of the disc. The disc further includes a second annular zone carrying marks of a first type and of a second type. The marks may be formed by pairs of adjacent marks, each pair having a same total circumferential length. The pairs of adjacent marks are referred to in the following as sectors. Preferably, the sectors of a given type within a pair have at least two different circumferential lengths. By rotating the disc and simultaneously measuring the circumferential length of the various sectors of a given type, those having different circumferential lengths can be determined, and the orientation can be determined coarsely based on these lengths. A fine adjustment of the orientation is then possible by detecting a border between sectors of different types, as will be explained in more detail later.

If the sectors of a given type have only two different circumferential lengths, it may be necessary to rotate the disc by a complete turn before it is possible to identify the various sectors of the given type. If no two sectors of the given type have the same circumferential length, it may be sufficient to measure the length of a single sector in order to tell the orientation coarsely.

The two types of sectors may preferably be distinguished in that those of the first type are transparent or reflective for a scanning signal whereas those of the second type are not. Further, preferably the circumferential length of the first type sectors is more than that of the second type sectors, so that when the disc is in an arbitrary orientation, the probability that the scanning signal will be transmitted and observed is higher than the probability that it is not observed.

If the first type sectors are transparent, they may simply and conveniently be formed as cut-outs. Conversely, if the first type sectors are reflective, the second type sectors may be formed as cut-outs.

In another embodiment of the invention the marks of the first and the second type are formed by the presence and the absence, respectively, of holes in the second annular zone. Each mark is placed within the second annular zone in such a way that one step of a stepper motor that is used for rotating the rotatable disc brings the next mark into the signal path of the sensor arrangement, i.e. the individual marks are equidistantly placed. In this case the sensor is a U-shaped arrangement of a signal emitter and a corresponding receiver, which are placed on opposite sides of the disc.

According to a preferred application of the invention, the features of the first zone are optical filters, but, as indicated above, other types of features are also conceivable. In yet another a preferred embodiment, the features of first annular zone are neutral density optical filters, or NDF, or optical effect filters.

The second object of the invention is achieved by a disc assembly comprising the disc as defined above, a frame in which the disc is rotatably mounted and a sensor arrangement held by the frame adjacent to said second annular zone for distinguishing between first and second type marks.

Preferably, the sensor arrangement detects an optical scanning signal, preferably infrared light. This is more convenient than e.g. a sensor arrangement that detects an electric contact since the optical sensor is not subject to wear and does not influence rotation of the disc. To this end, the sensor arrangement includes means for emitting a scanning signal and means for receiving the scanning signal. The scanning signal emitter and receiver may be placed on opposite sides of the disc, preferably in a U-shaped arrangement that overlaps the outer rim of the disc in a suitable manner. In this case, the first or second marks allow the scanning signal to pass through the disc or prevent the scanning signal from passing through the disc, or blocking it. It is also conceivable to use marks that either reflect the scanning signal, or do not reflect the scanning signal. In this case, the emitter and the receiver are located on the same side of the disc.

As a means for rotating the disc, a stepper motor is preferably used since it allows for an accurate control of the angular position by simply counting the number of steps of the motor. Further, such a motor can conveniently be locked in its correct angular position by short-circuiting it, so that moderate vibrations will not affect the position of the disc even when the motor is off. The holding torque of stepper motors in the locked position will be sufficiently high in most applications. If this is not the case, additional locking means are provided.

In one embodiment, the disc is provided with a toothed outer rim, which engages with a toothed driving wheel. The toothed driving wheel is driven by a stepper motor. Once the starting position or orientation of the disc is determined or known, a desired placement or positioning of the features that are provided in the first annular zone of the disc may be achieved by simply counting the steps of the stepper motor, as already mentioned above.

If a large number of features is to be used on a single disc, the radius of such a disc will increase in proportion to the number of features, so that a disc assembly comprising such a disc may become bulky and impractical. In order to keep the disc assembly compact while still having a large number of features available, it is advantageous to provide a second disc mounted on the same axis as said first disc, the two discs being rotatable independently from each other.

In a disc assembly having two discs, a second sensor arrangement may be provided for distinguishing between the marks of the first and second type of said second disc. However, it is also conceivable to use a single sensor for distinguishing between first and second type of marks of both discs, thus allowing positioning both discs using only one sensor arrangement.

If a single optical sensor is provided for determining the positions of the two rotatable discs, the sensor emits a sensor signal that may either pass through the disc arrangement, or is blocked by the disc arrangement. To this end the signal emitter is placed on one side of the disc arrangement, while a corresponding signal receiver is placed on the opposite side of the disc arrangement. An example of a sensor arrangement and the placement thereof is the U-shaped optical interrupter switch 100 shown in FIG. 5. In this case the second annular zones of the discs preferably have substantially the same radii.

Preferably, the sensor comprises a scanning signal source, e.g. an infrared-emitting diode and a scanning signal receiver such as an infrared-sensitive transistor or receiver diode located at opposite sides of said disc or discs.

Since there are two rotatable discs in the arrangement, the optical path for the sensor arrangement may be blocked, depending on the position of the rotatable discs. The features that are provided in the first annular zones of the rotatable discs may block the sensor signal. Also, one of the first or second types of marks may block the sensor signal, if a blocking type of mark happens to be positioned in the sensor signal path. In order to determine the position starting from an unknown initial state, it is necessary to find a position for both rotatable discs, in which the path of the sensor signal is not blocked, or a so-called open spot.

A method for finding an open spot includes the steps of rotating both rotatable discs simultaneously, either in the same direction or in opposite directions, until the sensor signal passes the disc arrangement and is detected. Once the sensor signal is detected, the rotation of one of the rotatable discs is stopped. The other disc continues rotating, and the mark pattern of that disc is determined, thus determining the position of the disc. Once the position of the disc is determined, it is brought into a desired position, in which the sensor signal is not blocked. Preferably, the marks at the correct positions of the respective features provided in the first annular zone do not block the sensor signal. The stepper motor used for positioning provide for a sufficient holding torque that holds the position of the disc when the motor is de-energized. Now the other disc is rotated until a mark pattern of that disc can be identified. Once the mark patterns of both discs are identified and the positions are known, the features of the first annular zone can be positioned by accordingly rotating the respective disc by a number of steps, which is known beforehand for each possible position, or which can be calculated using the known number of steps required for one complete revolution of the disc and the known number of features provided in the first annular zone.

An exemplary rotatable disc has 152 positions, in which marks may be detected. The disc has four features provided in the first annular zone that are to be positioned. This results in 38 marks per feature, of which nine are blocked by the features provided in the first annular zone, as shown in FIG. 7. Four marks are blocking the sensor signal, representing a logical 'zero'; the other marks do not block the sensor signal, representing a logical 'one'. The assignment of logical values may also be inverted without leaving the scope of the invention. The total count of blocked positions is 13. By simultaneously stepwise rotating the rotatable discs, the largest number of possibly blocked mark positions is 2×13=26. Knowing that not all blocked mark positions are arranged consecutively, the actual required number of rotating steps will be smaller.

When the positioning of the disc starts at a known position, it may be sufficient to only count the step pulses of the stepper motor. However, it may also be useful to continue detecting the mark pattern while rotating the disc. In one embodiment, the mark pattern is detected and checked only upon departure from the starting position. If the check delivers a correct start position, the disc may be rotated by the required number of steps without further detection and checking. In an advanced embodiment, detection and checking the mark pattern is resumed when the desired position is approached. In this case, the correct positioning of the feature provided in the first annular zone is indicated by a dedicated mark pattern. In this way it is possible to ensure that the feature is placed correctly, even if the stepper motor had, by accident, made too many or too few steps.

A suitable mark pattern for identifying the correct desired position, preferably the centre position of a set of marks, includes a unique change between marks of the first type and the second type that allows for identifying the position even when only part of the pattern is detected. This may be achieved by using a pattern that is symmetrical to the centre position, which, e.g., in each rotational direction has only one single change from a first-type mark to the second-type mark, or vice versa, the remainder of the pattern that is used for identifying the feature not having such a single change. When each step of the stepper motor used for rotating the disc advances the disc by one mark, or when the rotational displacement is steady with time, this method allows for identifying the centre position when beginning positioning of a new feature and/or arriving at the desired position of the new feature.

As was mentioned above, the marks at the correct positions of the respective features provided in the first annular zone do not block the sensor signal. The neighbouring marks to both sides of that mark that is placed in the signal path when the feature is correctly placed are chosen to block the sensor signal. This allows for identifying an unintended rotation of the discs, and as a consequence, the correct positions may be readjusted using the methods mentioned above.

The direction of the rotation required to correctly position a desired feature depends on the current starting position. As the starting position and the position of each feature on the disc are known beforehand, the lowest possible number of steps may be used to bring a new feature into a desired position by selecting the appropriate direction for rotating.

The third object of the invention is achieved by a video camera comprising a disc assembly as defined above, in which the features are optical filters.

The fourth object of the invention is achieved by a method for adjusting the orientation of the disc as defined above, comprising the steps of providing a sensor adjacent to said second annular zone, rotating the disc and recording any angle at which a transition between first and second type sectors is observed by said sensor, calculating the length of any thus observed first or second type sector, and when the thus calculated length matches a predefined length, placing the disc at one of the recorded angles corresponding to the borders of the sector having the predefined length.

A somewhat more sophisticated method to be used for adjusting the orientation of a first disc in a disc assembly having two discs, as explained above, and a scanning sensor comprising a scanning signal source and a scanning signal receiver located at opposite sides of said discs, comprises the steps of a) deciding whether a signal level observed by the sensor in a starting configuration of the assembly corresponds to two first type sectors of the two discs overlapping, i.e. to the scanning signal being received at the receiver, or to at least one second type sector of either disc blocking the scanning signal between source and receiver, b) if it is found that a second type sector blocks the receiver, rotating the two discs until two first type sectors are observed to overlap between source and receiver. If the first type sectors are longer than the second type sectors, as recommended above, there must be a region in the second annular zone where first type sectors of both discs overlap, and by rotating the two discs at the same speed, it is possible to bring this region between the source and receiver of the sensor. When this is done, the orientation of the first disc may further be adjusted by c) rotating the first disc and recording any angle at which a transition between first and second type sectors is observed by said sensor, d) calculating the length of any thus observed first or second type sector, and e) when the thus calculated length matches a predefined length, placing the first disc at one of the recorded angles corresponding to the borders of the sector having the predefined length.

It is also possible in step b) to rotate the two discs at different speeds until two first type sectors are observed to overlap. This may be necessary if the length of the first type sectors is not more than that of the second type sectors, or if there are more than two discs installed on a same axis.

BRIEF DESCRIPTION OF THE SEVERAL VIEWS OF THE DRAWINGS

Further features and advantages of the invention will become apparent from the subsequent description of embodiments thereof referring to the appended figures.

DETAILED DESCRIPTION OF THE INVENTION

Figure 1:
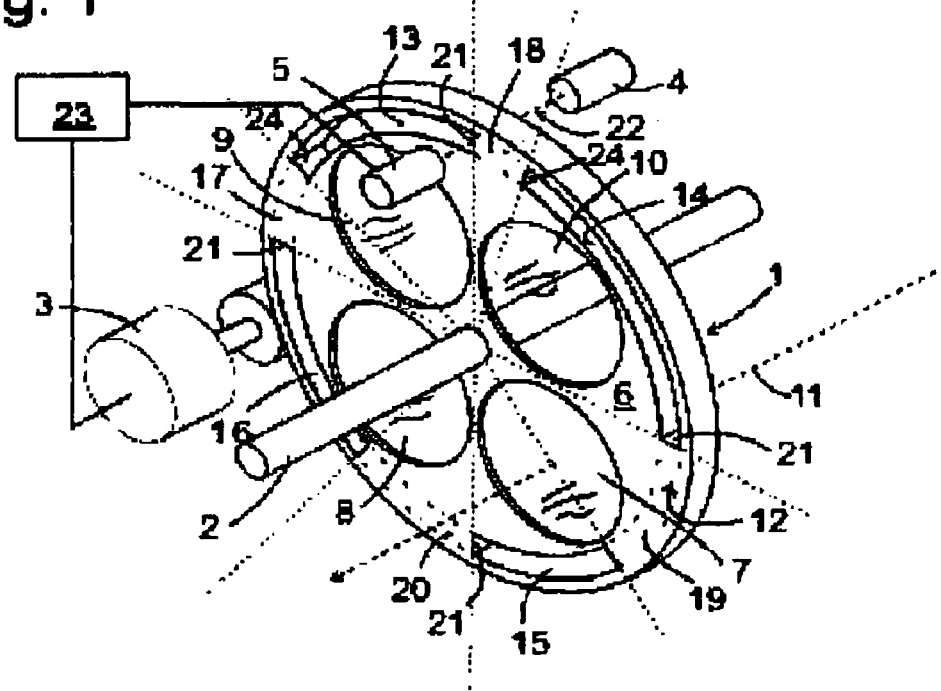
FIG. 1 is a schematic perspective view of a disc assembly having a single rotatable disc, according to a first embodiment of the invention.

FIG. 1 shows a disc 1 rotatably mounted on a stationary shaft 2. The shaft 2 is fixed to a frame, not shown. A stepper motor 3, and a sensor formed of an infrared light-emitting diode 4 and a phototransistor 5 are also fixed to the frame. Cogs formed at the circumference of disc 1 engage a pinion driven by stepper motor 3.

The disc 1 has a first, central zone 6 in which four circular filter holes 7 to 10 are formed at 90° angles with respect to each other. In each filter hole, a filter of a different type is mounted.

The wheel assembly of FIG. 1 is part of a video camera, the optical axis of which is represented by a dashed line 11 in the Figure. In the configuration shown, it extends through the centre of filter hole 7.

The disc 1 has a second, annular zone 12 surrounding the first zone 6. The second zone 12 can be considered to be formed of four pairs of sectors, one pair per filter hole, one sector of each pair being formed by a cut-out 13 to 16 and the other 17 to 20 by a solid material impervious to the radiation of diode 4.

Diode 4 and phototransistor 5 are located at opposite sides of the second zone 12 of disc 1, so that, according to the orientation of the disc, radiation from diode 4 will either reach phototransistor 5 through one of the cut-outs 13 to 16 or will be blocked by one of solid sectors 17 to 20.

The circumferential length of each pair 13 plus 17, 14 plus 18, 15 plus 19 or 16 plus 20 of sectors is the same, so that all cut-out sectors have one end 21, the end in the clockwise direction in the perspective of FIG. 1, which is distant by 90° from the corresponding end 21 of a neighbouring cut-out sector. The terms clockwise and counter-clockwise referring to the view presented in the figures are used in the following for easier understanding. As there are only two directions to rotate the disc, the more general terms first and second rotating direction also apply. The length of the cut-out sectors is different for each sector 13 to 16, and it is more than the length of the solid sectors 17 to 20.

In the orientation of FIG. 1, in which filter hole 7 is centred upon the optical axis 11, the centre of the infrared beam from the filter diode 4, represented by dashed line 22 in FIG. 1, passes exactly along the clockwise end 21 of cut-out sector 13, so that only about half of the infrared power emitted by diode 4 is received by phototransistor 5.

Phototransistor 5 and stepper motor 3 are connected to a control circuit schematically represented by a box 23 in FIG. 1, which controls movement of the stepper motor 3 based on the output of the phototransistor 5.

An operating method of the control circuit 23 will now be described referring to the flow chart of FIG. 3. In a first step S1, the control circuit 23 receives a command from outside for placing a given filter on the optical axis 11. The command may simply specify one out of filter holes 7 to 10, in which case the control circuit 23 will consult an internal storage in order to find out the width of the solid sector 17, 18, 19 or 20 that corresponds to the specified filter hole. Alternatively, the external command may directly specify this width.

The control circuit 23 then drives the stepper motor 3 in the counter-clockwise direction (S2), until a rise in the infrared intensity received by the phototransistor 5 is observed for the first time. When this happens (S3), a counter-clockwise end 24 of one of the cut-out sectors 13 to 16 has reached the beam 22. The control circuit 23 then resets a counter (S4) and continues to rotate the disc 1 counter-clockwise, counting each step of stepper motor 3 by means of the counter, until a decrease in the output of phototransistor 5 is observed (S5). When this happens, the counter-clockwise end 21 of the cut-out sector has reached beam 22. Then, the counter is read (S6), and its value, which is representative of the length of the cut-out sector which has just been scanned by beam 22 is compared to the expected width of the cut-out sector corresponding to the filter hole specified in the command of step S1.

If the two widths correspond to each other, the correct filter hole has been found, and, since the beam 22 is at the counter-clockwise end 21 of the corresponding cut-out sector, the specified filter hole is already centred upon the optical axis 11, so that the adjusting process is finished. If the detected width and the expected width do not agree in step S6, the process returns to step S2 and is continued, until, finally, a sector having the specified width is found.

The above procedure is operable only if each filter hole is associated to a solid sector or a cut-out sector having a specific width which is different from the widths of all other sectors of the same type. However, it is also possible to adjust the angular position of a disc 1 in which only one of the cut-out or solid sectors has a width that differs from that of the others. In that case, when a command for placing a given filter hole on the optical axis 11 is received, the control circuit 23 has the disc rotated counter-clockwise and the widths of its cut-out sectors measured and recorded, until the cut-out sector can be identified whose width is different from that of the others. When this sector is identified, the control circuit 23 continues to rotate the disc until a number of cut-out sectors as specified in the command has been scanned by the beam 22, and stops the rotation at the clockwise end of the specified cut-out sector.

Figure 3:
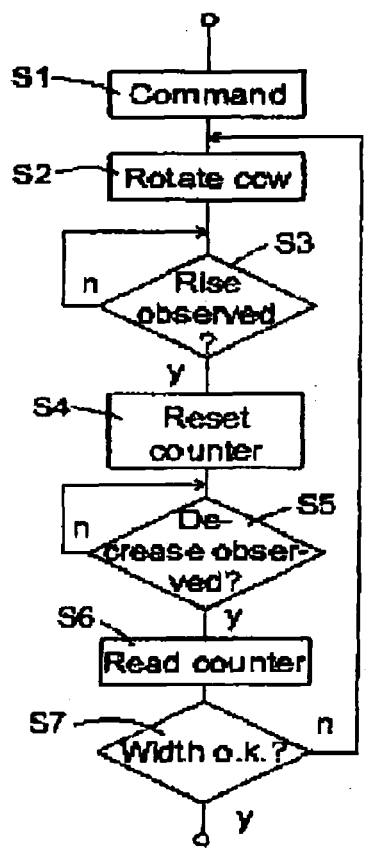
FIG. 3 is a flow chart of a method for adjusting the rotatable disc of FIG. 1.

According to an improved adjusting method the control circuit 23 carries out steps S1 to S6 of FIG. 3 just once, thus detecting the width of one cut-out. It then compares the detected width to stored widths of the four cut-outs and thus decides which one of them was observed, i.e. what the present orientation of the rotatable disc is. It then decides whether the orientation specified in the command of step S1 can be reached more quickly by rotating clockwise or counter-clockwise, and sets the direction of rotation of motor 3 accordingly. If the direction continues to be counter-clockwise, the control unit stops the rotation of motor 3 when the cut-out sector corresponding to the filter specified in command S1 has been scanned completely and a decrease of the infrared intensity observed by the phototransistor 5 shows that the clockwise end of the cut-out has been reached. In case of the rotation direction being set to clockwise, the control unit stops the rotation of the motor at the very instant in which a rise of the infrared intensity is observed which indicates that the desired cut-out has been reached.

According to a still further embodiment, the control unit has a rewriteable permanent storage, e.g. an EEPROM, in which the identity of the filter currently placed upon the optical axis 11 is recorded. Based on this recording, the control circuit 23 is able to estimate a current orientation of the filter disc upon power on, so that when a command for placing a given filter on the optical axis is received, it judges, based on the stored orientation, whether the new orientation is reached more quickly by rotating clockwise or counter-clockwise. After choosing the direction of rotation, here, too, the width of a cut-out sector is determined by a procedure as described above with respect to steps S3 to S6, in order to judge whether the stored orientation was indeed correct. If it is, the control unit continues to rotate the disc in the chosen direction until the desired orientation is reached; if not, the direction of rotation may be chosen anew.

It is readily apparent that control procedures similar to those described above can be carried out based on a measurement of the width of the solid sectors instead of the cut-out sectors. In this case, the rotation direction is preferably clockwise.

Figure 2:
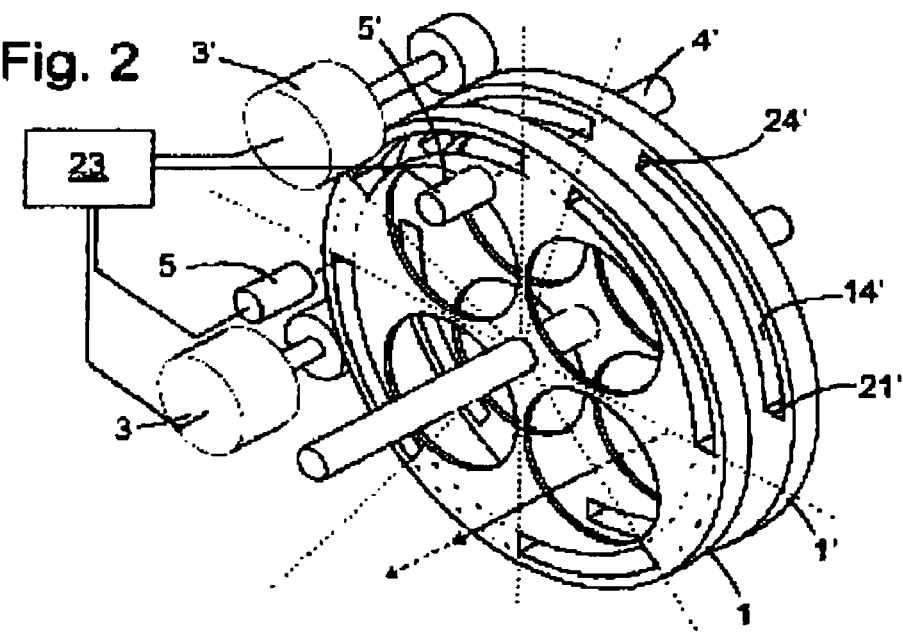
FIG. 2 is a perspective view of a disc assembly having two rotatable discs.

FIG. 2 is a perspective view of a second embodiment of a disc assembly according to the invention. This assembly has two discs 1, 1', rotatably mounted to a same shaft 2. The two discs, 1, 1' are identical to the disc 1 of FIG. 1 and to each other, except for the filters installed in the filter holes, and will therefore not be described anew. For the sake of clarity, not all reference numerals of FIG. 1 are copied into FIG. 2, and it will be understood that reference numerals having a prime (') refer to elements of or associated to the second disc 1' that are corresponding elements of or associated to the first disc having the same reference numeral.

The frame has two stepper motors 3, 3', each for rotating one of the discs 1, 1', two diodes 4, 4' and two phototransistors 5, 5' mounted to it. The diodes 4, 4' and phototransistors 5, 5' are installed at an angle of 90° with respect to each other, so that when the discs are adjusted, both phototransistors will simultaneously see a clockwise end 21 of a cut-out sector of either disc 1 or 1'. Here, the control circuit 23 is adapted to drive either of stepper motors 3, 3' independently from the other.

A method for adjusting the orientation of the two discs 1, 1' will be explained based on the flowchart of FIG. 4. In step S1, a command is received which specifies filter holes to be placed on the optical axis 11 for both discs 1, 1'. The control circuit 23 determines in step S12 whether any of the phototransistors 5, 5' receives light from the corresponding diode 4, 4'. If at least one receives light, the process goes straight to a step S15; if not, both discs 1, 1' are rotated simultaneously and at the same speed. Since the total length of the solid sectors 17 to 20, 17' to 20' of either disc is less than half of the circumferential length of the second zone 12, 12', there is no orientation of the discs 1, 1' in which there is absolutely no overlap between cut-out sectors of the two discs. Therefore, by rotating the two discs alike, sooner or later, one of the two phototransistors 5, 5' will be found to see light in step S14.

In step S15, if both phototransistors 5, 5' see light, the control circuit may arbitrarily choose any disc 1 or 1' to be adjusted first. If only one phototransistor sees light, the control circuit chooses the disc 1 or 1' associated to this phototransistor 5 or 5'. The procedure then carried out (S16) for the chosen disc is the same as in steps S2 to S7 described above with respect to FIG. 3. When the adjustment of the first-chosen disc 1 or 1' has succeeded, the same steps S2 to S7 are repeated for the other disc 1 or 1' (S18).

Since the clockwise ends 21, 21' of all cut-outs 13 to 16, 13' to 16' are 90° apart, and so are the diodes 4, 4' and phototransistors 5, 5', when the first disc has been adjusted, the beam from the diode associated to the other disc will pass along a clockwise end of a cut-out sector of the first disc, so that the intensity seen by the associated phototransistor may be low, even when a cut-out sector of said other disc is between the two. It may therefore be useful, after having adjusted the first disc and before beginning to adjust the second, to turn the first disc clockwise by one or more steps of its stepper motor (S17), in order to insure that the first disc will not block the light from the diode of the second disc while adjusting it. When the second disc has also been adjusted successfully, the first disc is rotated back by the same number of steps in S19, so that both discs are perfectly adjusted.

Figure 4:
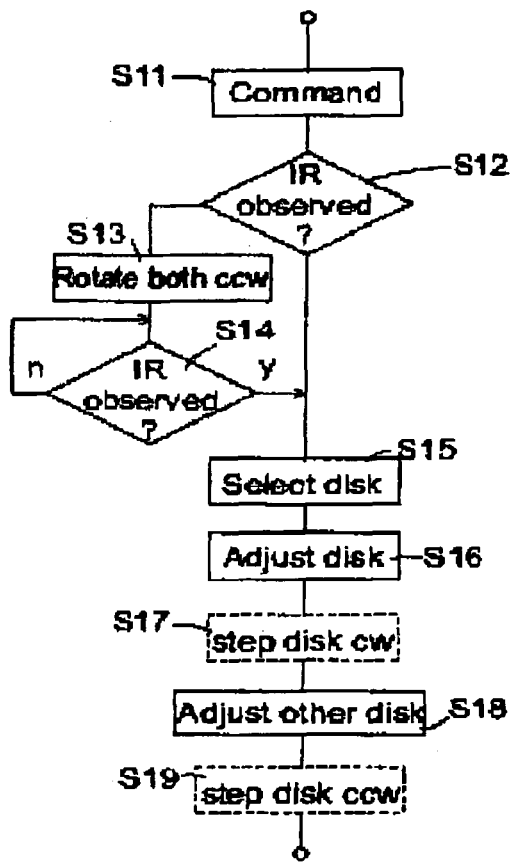
FIG. 4 is a flow chart of a method for adjusting one of the rotatable discs of FIG. 2.

FIG. 2 shows two diodes 4, 4' and two phototransistors 5, 5', and in the above description of the procedure of FIG. 4, it has been assumed that each disc 1, 1' has a diode and a phototransistor associated to it. However, it is quite conceivable to have only one diode and phototransistor and to use the output of that same phototransistor for carrying out the adjusting procedures both of step S16 and of step S18.

According to another embodiment of the two-disc assembly, the disc 1', although identical in shape to disc 1, is installed in a turned-over orientation, i.e. with the rear sides of the two discs facing each other. In this way, in disc 1', the counter-clockwise ends 24' of the cut-out sectors are constantly 90° apart from each other, whereas the distance between the clockwise ends 21' varies according to the length of the cut-out sectors. Again, each disc 1, 1' has a sensor formed of an infrared-emitting diode 4, 4' and a phototransistor 5, 5', respectively, associated to it. The angular distance between the two sensors is 45°, which is less than the width of the shortest ones of the cut-out sectors 13 to 16. Accordingly, if one disc has been adjusted, it is insured that a cut-out sector of this disc will be between the diode and the phototransistor of the other disc, so that steps S17 and S19 are unnecessary.

A procedure for adjusting the two discs 1, 1' of this embodiment may begin with steps S11 to S15, as described above. If the disc to be adjusted in step S16 is disc 1, the adjusting procedure is the same as in steps S2 to S7 of FIG. 3, so that when the decrease in infrared intensity is observed in step S5, this will be due to a clockwise end 21 entering the beam. If disc 1' is selected to be adjusted in step S16, the direction of rotation in step S2 is clockwise instead of counter-clockwise, so that when the decrease is observed in S5, it is due to a counter-clockwise end entering the beam. In either case, if the width of the cut-out sector read from the counter in step S6 agrees with the width specified in the command of step S11, the disc 1 or 1' is perfectly adjusted.

Although not specifically described here, it will be readily apparent to the skilled reader that adjustment procedures similar to those described above can be carried out if the phototransistors and light-emitting diodes of each sensor are placed on a same side of the disc to which they are associated, and in each disc the cut-outs 13 to 16 or 13' to 16' are replaced by reflective sectors and the solid sectors 17 to 20, 17' to 20' by non-reflective sectors, e.g. cut-outs. In a two disc-assembly, this may even simplify the adjusting procedure since the procedures for the two discs become independent from one another and may be carried out according to the method of FIG. 3. Here, the two discs may even be adjusted simultaneously.

Figure 5:
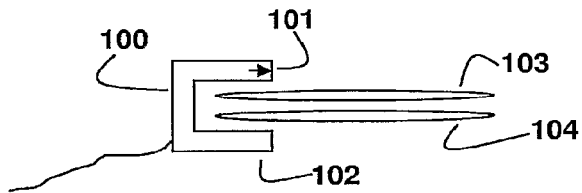
FIG. 5 shows a single sensor arrangement for determining the position of two discs in a side view.

FIG. 5 shows a schematic side view of a two-disc arrangement and the single sensor according to the invention. The two discs 103, 104 are places on one axis (not shown). A U-shaped sensor arrangement 100 having a signal emitter 101 and a signal receiver 102 is placed in such a way that the direct line of the signal between emitter and receiver goes through the two discs 103, 104.

Figure 6:
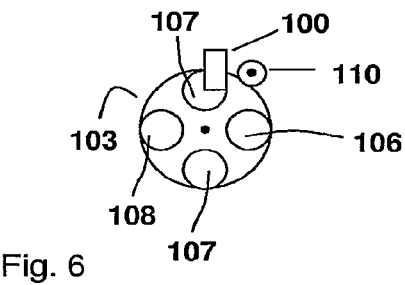
FIG. 6 shows the single sensor arrangement of FIG. 6 in a top view.

FIG. 6 shows a top view of the two-disc arrangement of FIG. 5. The position of the sensor arrangement 100 relative to the surface of the discs 103, 104 can clearly be seen. A motor 110 with a cog wheel is placed at the outer rim of the discs for driving. For simplicity reasons, only one motor 110 and disc 103 is shown. The disc 103 further has features 106, 107, 108, 109, which may be optical filters.

Figure 7:
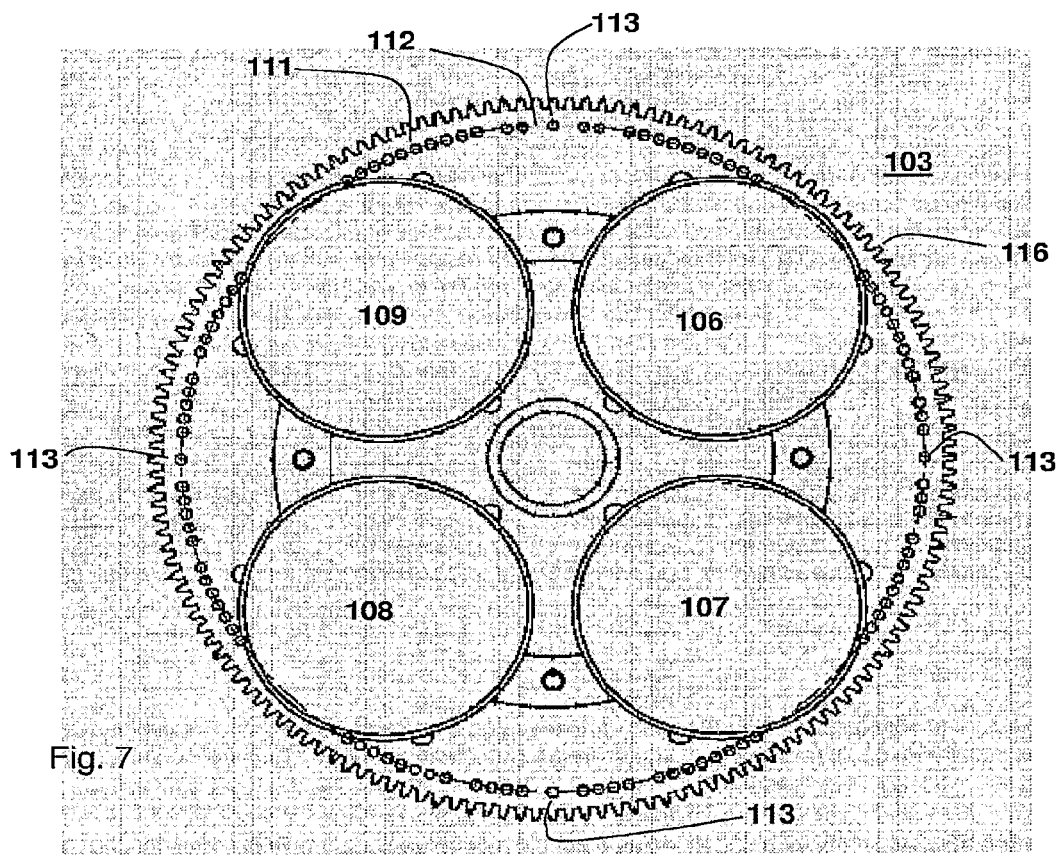
FIG. 7 shows an exemplary disc having four features in the first annular zone.

FIG. 7. shows a more detailed view of an exemplary embodiment of a disc according to the invention. The disc 103 has four features 106, 107, 108, 109 centred along a first radius (not shown) in the first annular zone. Sets of marks of the first 111 and second 112 type are arranged in the second annular zone, centred along a second radius. The marks of the first type are represented by holes. The marks of the second type are represented by the absence of holes. The centre 113 of a set of marks, which also represents the desired correct position, is represented by a centre pattern having a single mark of the first type 111 with marks of the second type 112 on both sides of it. The single mark of the first type is preferably not blocking the path of the sensor signal, thereby allowing for easy detection of an unwanted rotational displacement of the disc. In the exemplary disc of FIG. 7 the individual features can be identified by counting the number of marks of the first type adjacent to the centre pattern until the next mark of the second type is detected. The sum of marks of the first and the second type within one set of marks is the same for all features. In the figure, the features overlap into the second annular zone, thereby forming the border between two sets of marks. If this were not the case, the border between two sets of marks may be identified by counting the total number of marks of the first and second type, beginning from the centre position. The outer rim of the disc further shows the cogs 116 that engage with the cog-wheel used for driving (not shown).

Figure 8:
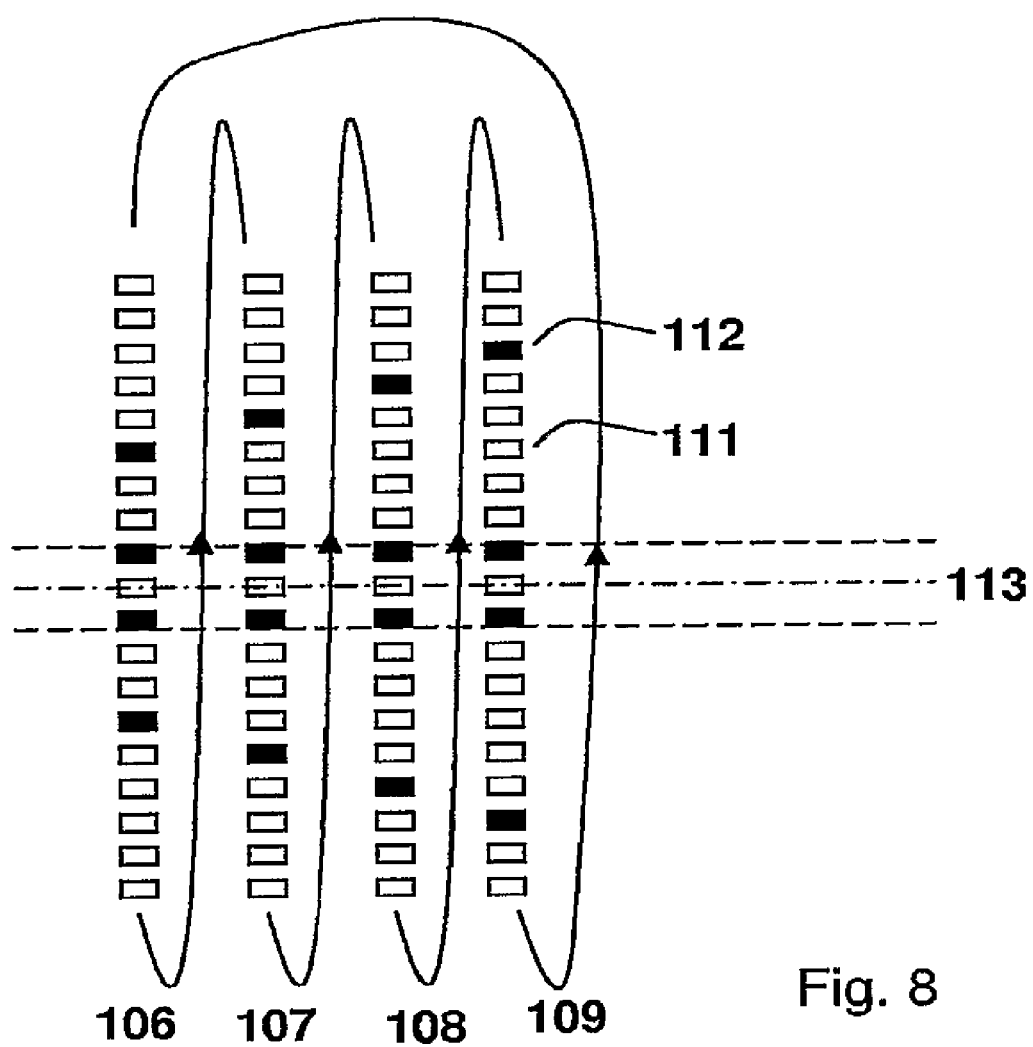
FIG. 8 shows an exemplary mark pattern for a four-feature disc.

FIG. 8 shows different exemplary pattern formed by sets of marks on a disc. The pattern are shown side-by-side instead being arranged in a circle. Marks of the first type 111 are represented by the white rectangles, while marks of the second type 112 are represented by the black rectangles. The centre position 113 for each set of marks is indicated by the sequence of marks of the first and the second type inside the dashed lines. The symmetry of the pattern allows for identification of the respective feature independent of the direction of rotation.

The invention claimed is:

1. A rotatable disc comprising:
a first annular zone in which a plurality of features is located centered along a first radius preferably at uniform angles from each other with respect to an axis of rotation of the disc and a second annular zone carrying sets of distinguishable marks of a first and a second type in a single line centered along a second radius, each set of marks having a same total circumferential length, the marks of a first and second type being arranged within the set of marks such that they form a code, which allows for identifying the respective set of marks, wherein consecutive marks of the first and the second type form respective adjacent sectors along the second radius and wherein the summed circumferential length of the first or the second type marks, respectively, within a sector can be used for identifying the respective set of marks.

2. The disc of claim 1, wherein the relative position of the marks of the first and the second type within a set of marks can be used to identify the respective set of marks.

3. The disc of claim 1, wherein the marks of the first and the second type are arranged symmetrically within the total circumferential length of a set of marks.

4. The disc of claim 1, wherein the beginning, center and/or end of a set of marks of the first and the second type is identifiable by a predetermined sequence of first and second marks.

5. The disc of claim 1, wherein the marks of the first type are transparent or reflective for a scanning signal, whereas the marks of the second type are not, and wherein the features of the first zone are optical filters.

6. A disc assembly including a rotatable disc, the disc having a first annular zone in which a plurality of features is located centered along a first radius preferably at uniform angles from each other with respect to an axis of rotation of the disc, the disc further having a second annular zone carrying sets of distinguishable marks of a first and a second type in a single line centered along a second radius, each set of marks having a same total circumferential length, the marks of a first and second type being arranged within the set of marks such that they form a code, which allows for identifying the respective set of marks, wherein consecutive marks of the first and the second type form respective adjacent sectors along the second radius and wherein the summed circumferential length of the first or the second type marks, respectively, within a sector can be used for identifying the respective set of marks, the disc assembly further including a frame in which the disc is rotatably mounted, and a sensor arrangement, preferably an optical sensor arrangement, the sensor arrangement being held, by the frame adjacent to said second annular zone, the sensor arrangement being apt to distinguish between marks of the first and second type, wherein a second disc is mounted on a same axis as said first disc, the two discs being rotatable independently from each other and that wherein a single sensor arrangement is provided for distinguishing between first and second type of marks of said first and second discs.

7. The disc assembly of claim 6, further including a stepper motor for rotating each disc, one step of the stepper motor preferably rotating the disc by one mark of the first or second type.

8. The disc assembly of claim 6, wherein in one of the two discs, ends of the first type marks are uniformly spaced seen in a first rotational direction, whereas in the other disc, ends of the first type of marks are uniformly spaced seen in a second rotational direction.

9. The disc assembly of claim 6, wherein a second sensor arrangement is provided for distinguishing between marks of the first and second types of said first and second disc.

10. The disc assembly of claim 6, wherein the distance between the two sensor arrangements in the circumferential direction is less than the circumferential length of the shortest one of the first or second type marks.

11. The disc assembly of claim 6, wherein the sensor arrangement comprises a scanning signal source and a scanning signal receiver located at opposite sides of said disc or discs.

12. A video camera comprising a rotatable disc having a first annular zone in which a plurality of features is located centered along a first radius preferably at uniform angles from each other with respect to an axis of rotation of the disc and a second annular zone carrying sets of distinguishable marks of a first and a second type in a single line centered along a second radius, each set of marks having a same total circumferential length, the marks of a first and second type being arranged within the set of marks such that they form a code, which allows for identifying the respective set of marks, wherein consecutive marks of the first and the second type form respective adjacent sectors along the second radius and wherein the summed circumferential length of the first or the second type marks, respectively, within a sector can be used for identifying the respective set of marks.

13. A method for adjusting the orientation of a rotatable disc having a first annular zone in which a plurality of features is located centered along a first radius preferably at uniform angles from each other with respect to an axis of rotation of the disc and a second annular zone carrying sets of distinguishable marks of a first and a second type in a single line centered along a second radius, each set of marks having a same total circumferential length, the marks of a first and second type being arranged within the set of marks such that they form a code, which allows for identifying the respective set of marks, wherein consecutive marks of the first and the second type form respective adjacent sectors along the second radius and wherein the summed circumferential length of the first or the second type marks, respectively, within a sector can be used for identifying the respective set of marks, wherein a sensor is provided adjacent to said second annular zone, the method comprising the steps of:

a) rotating the disc and finding positions at which a border between two sets of marks of the first and second type is observed by said sensor, b) determining the total summed circumferential lengths of any thus observed first or second type marks, c) when the thus determined circumferential lengths match predefined lengths, placing the disc at one of the positions corresponding to the borders of the set of marks having the predefined circumferential length.

14. The method of claim 13, wherein step a) is replaced by rotating the disc and finding a predetermined pattern formed by marks of the first and second type indicating a center position;

step b) is replaced by determining the pattern formed by marks of the first and second type within one set of marks, starting at the center position and rotating in an arbitrary direction;

step c) is replaced by positioning the disc at a center position associated with a desired feature.

15. A method for adjusting the orientation of a first disc in a disc assembly including:

a rotatable disc, the disc having a first annular zone in which a plurality of features is located centered along a first radius preferably at uniform angles from each other with respect to an axis of rotation of the disc, the disc further having a second annular zone carrying sets of distinguishable marks of a first and a second type in a single line centered along a second radius, each set of marks having a same total circumferential length, the marks of a first and second type being arranged within the set of marks such that they form a code, which allows for identifying the respective set of marks, wherein consecutive marks of the first and the second type form respective adjacent sectors along the second radius and wherein the summed circumferential length of the first or the second type marks, respectively, within a sector can be used for identifying the respective set of marks;

a frame in which the disc is rotatably mounted;

a second disc that is mounted on a same axis as said first disc, the first and second discs being rotatable independently from each other;

a single sensor arrangement, preferably an optical sensor arrangement, the sensor arrangement being held by the frame adjacent to said second annular zone of the discs, the sensor arrangement being adapted to distinguish between marks of the first and second type, wherein the single sensor arrangement is provided for distinguishing between first and second type of marks of said first and second disc, wherein said sensor arrangement includes a scanning signal source and a scanning signal receiver located at opposite sides of said first and second discs, the method including the steps of:

d) deciding whether a signal level observed by the sensor in a starting configuration of the assembly corresponds to two marks of the first type of the two discs essentially overlapping, or to at least one mark of the second type of either disc blocking the scanning signal between source and receiver, e) if it is determined that a mark of the second type blocks the scanning signal, rotating the two discs until two marks of the first type are observed to essentially overlap between source and receiver, f) rotating the first disc and finding positions at which a border between two sets of marks of the first and second type is observed by said sensor, g) determining the summed total lengths of any thus observed marks of the first or second type within a set of marks, h) when the thus determined lengths match predefined lengths, placing the first disc at one of the positions corresponding to the border of the set of marks having the predefined circumferential length, i) repeating steps f) to h) for the second disc, while preventing the first disc from moving.

16. The method of claim 15, wherein step f) is replaced by rotating the first disc and finding a predetermined pattern formed by marks of the first and second type indicating a center position;

step g) is replaced by determining the pattern on the first disc formed by marks of the first and second type within one set of marks, starting at the centre center position;

step h) is replaced by positioning the disc at a center position associated with a desired feature.

17. The method of claim 6, wherein the rotation is effected by a stepper motor driven by drive pulses, further including the steps of:

counting the drive pulses when bringing the disc into a new position;

continuously detecting the marks of the first and the second type, thereby detecting the pattern identifying the feature and the center position pattern;

stopping the rotation of the disc after a predetermined number of drive pulses;

if the center position pattern of the desired feature is detected before the predetermined number of pulses is counted, inhibiting further drive pulses;

if the center position pattern of the desired feature is not detected after the predetermined number of drive pulses, continuing the drive pulses until the center pattern of the desired feature is detected.

18. The method of claim 17, wherein the step of continuously detecting the marks of the first and the second type is performed after the predetermined number of drive pulses for placing the desired feature minus a smaller, predetermined number is counted, the smaller, predetermined number being at least as large as the number of marks that are necessary to identify the center position.

19. The method of claim 17, wherein the step of continuously detecting the marks of the first and the second type is performed at the beginning of the drive pulses for a predetermined number of drive pulses for determining the center pattern, the predetermined number being at least as large as the number of marks that are necessary to identify the center position, whereby the correct starting position is reassured.

20. A video camera comprising a disc assembly, the disc assembly comprising:

a rotatable disc, the disc having a first annular zone in which a plurality of features is located centered along a first radius preferably at uniform angles from each other with respect to an axis of rotation of the disc, the disc further having a second annular zone carrying sets of distinguishable marks of a first and a second type in a single line centered along a second radius, each set of marks having a same total circumferential length, the marks of a first and second type being arranged within the set of marks such that they form a code, which allows for identifying the respective set of marks, wherein consecutive marks of the first and the second type form respective adjacent sectors along the second radius and wherein the summed circumferential length of the first or the second type marks, respectively, within a sector can be used for identifying the respective set of marks;

a frame in which the disc is rotatably mounted;

a second disc that is mounted on a same axis as said first disc, the first and second discs being rotatable independently from each other;

a single sensor arrangement, preferably an optical sensor arrangement, the sensor arrangement being held by the frame adjacent to said second annular zone of the discs, the sensor arrangement being adapted to distinguish between marks of the first and second type, wherein the single sensor arrangement is provided for distinguishing between first and second type of marks of said first and second disc.

* * * * *